TRANSMISSION AND RECONSTRUCTION OF ARTIFICIAL SPEECH

INVENTOR
H. L. BARNEY
BY Harry C. Hart
ATTORNEY

TRANSMISSION AND RECONSTRUCTION OF ARTIFICIAL SPEECH

Filed Sept. 30, 1954 3 Sheets-Sheet 2

INVENTOR
H. L. BARNEY
BY Harry C. Hart
ATTORNEY

INVENTOR
H. L. BARNEY
BY Harry C. Hart
ATTORNEY

United States Patent Office 2,819,341

Patented Jan. 7, 1958

2,819,341

TRANSMISSION AND RECONSTRUCTION OF ARTIFICIAL SPEECH

Harold L. Barney, Madison, N. J., assignor to Bell Telephone Laboratories, Incorporated, New York, N. Y., a corporation of New York Application September 30, 1954, Serial No. 459,333

13 Claims. (Cl. 179—1)

This invention relates to the transmission of speech currents over narrow band media by vocoder techniques. One of its principal objects is to reduce the channel bandwidth required for such transmission. Another object is to simplify and improve the analyzer and synthesizer by which such transmission is carried out. Another object is to improve the accuracy and realism with which speech sounds are artificially reconstructed.

In the vocoder transmission system of Dudley Patent 2,151,091 an input speech wave is applied to a number of different filters connected in parallel to determine its fundamental frequency or pitch and the distribution of amplitudes among a number of frequency sub-bands into which the speech frequency range is divided. The result of this analysis is translated into a number of control currents, each representative of the energy in one sub-band. The control currents are transmitted to a synthesizer and are there utilized to build up, from energy sources in the synthesizer, an artificial speech wave having the characteristic pitch and amplitude-frequency distribution of the original impressed speech.

Experience with vocoders of this type, which have come to be known as "filter bank" vocoders, has led to an improvement known as the "resonance" vocoder, various forms of which are described in Dudley Patent 2,243,527, in Vermeulen et al. Patent 2,458,227 and in Steinberg Patent 2,635,146. Briefly, such a system divides the voice frequency range into a small number, e. g., three, of comparatively wide bands each of which embraces a single group of harmonics in which the speech energy tends to be concentrated. Such a group of components is termed a formant. The resonance vocoder derives for each such band both a frequency control current and an amplitude control current. These control currents, which occupy much narrower spectrum bands than the voice currents from which they are derived, are transmitted to a receiver station where they control the operation of artificial voice synthesizing apparatus. A hiss source or a buzz source, in dependence on whether the sound being analyzed is unvoiced or voiced, is applied to a network whose function it is to simulate the vocal tract, and the elements of this network are altered by the control currents in a fashion to simulate the changes of configuration of the vocal tract which take place in the course of the articulation of speech sounds.

In the analyzer portion of a resonance vocoder of known construction, as in the analyzer portion of the earlier filter bank vocoder, the original speech currents are applied to all of a group of filters in parallel, and the control currents are identified, for proper application to the synthesizer apparatus, in terms of the particular one of the group of filters from which it is derived. In the case of the filter bank vocoder each such control current stands for a particular frequency component of the speech sound being analyzed. In the case of the resonance vocoder the two members of each such pair of control currents stand for the frequency and the amplitude, respectively, of one of the formants.

This parallel arrangement of filters, which is necessary for the analysis of an arbitrary sound, places a heavy discrimination burden on each filter inasmuch as each filter is required to pass only a small fraction of the energy applied to it and to exclude the major portion of such energy.

The present invention is predicated on the realization that the sounds of human speech are by no means arbitrary, but have, to the contrary, certain very specific characteristics; in particular it is characteristic of a voiced speech sound that the first formant is generally of substantially greater amplitude than the second and that the second formant is generally of substantially greater amplitude than the third. This amplitude distribution which holds between speech formants is illustrated in Fig. 3 of Steinberg Patent 2,635,146. In particular it has been experimentally determined that, to a good approximation, the amplitudes of the formants of human speech sounds stand in an inverse relation to their frequencies.

The present invention turns these characteristics of human speech to account in reducing the discrimination burden which is placed upon the analyzing filters, thereby making for simplification of design and economy in construction. As distinguished from the parallel arrangement of the prior art the invention provides a tandem arrangement of a plurality of filters, for example two, with progressively narrower passbands. In particular the filters may be high-pass filters each of which has a low-frequency cutoff, the low cutoff frequencies of the successive filters being arranged at successively higher points on the frequency scale. A frequency indicating device such as a cycle counter is coupled to the input terminals of each of these filters and generates a control current representative of the frequency of the predominant component applied to it. Each of these control currents is transmitted to synthesizer apparatus, there to control the reconstruction of artificial speech. In accordance with the invention, however, each of these control currents is additionally applied to shift the low-frequency cutoff of the following filter in such a way as to exclude from the energy applied to it the major component whose frequency has just been determined. As a result, the output of the first filter contains only the second and higher formants, the first formant having been excluded. A frequency indicating device connected at this point measures the frequency of the predominating component applied to this point and, because of the amplitude relation which holds between the formants, this indicated frequency is that of the second formant. A control current representing the second formant frequency is transmitted to the synthesizer apparatus and, in accordance with the invention, it is utilized in addition to adjust the low-frequency cutoff of the next filter in a fashion to exclude the second formant frequency. Consequently the energy appearing at the output terminals of the second filter contains only the third and higher formants, and a frequency indicating device connected at this point measures the third formant frequency.

This process may be repeated by the employment of additional tandem connected stages as often as desired. As a practical matter, however, artificial speech can be adequately synthesized from three formant frequency control currents and a fundamental frequency control current. Hence, as a practical matter, a tandem arrangement of two such variable cutoff filters suffices, with three frequency indicating devices coupled to them in the foregoing fashion.

The same relation which holds as between the amplitudes of the several speech formants is further turned to account in a different fashion at the synthesizer station to dispense with the formant amplitude control currents of prior art resonance vocoders. That is to say, the empirical amplitude-frequency formant distribution is built into the synthesizer apparatus in such a fashion that the formant frequency control currents, derived as described above, operate not only to tune the vocal tract-simulating resonant circuits at the synthesizer but also to adjust the amplitudes of the currents passing through these circuits. By eliminating the need for formant amplitude control currents, the invention makes for substantial reduction in the bandwidths of the control current transmission channel.

The invention also provides for the holding of various significant quantities to their latest values when generation of control currents ceases between voiced sounds. It is characteristic of speech that voiced sounds are interspersed with unvoiced sounds. During an unvoiced sound the pitch is indeterminate and the pitch control current becomes too insignificant to be of use or ceases altogether. With prior art apparatus, all adjustments such as the frequency of the buzz source return to arbitrarily selected initial values. It has been determined on the basis of a statistical examination of many speech sounds that, when voicing returns, the most likely new value for the buzz frequency is its latest voiced value. Hence, the invention provides a holding circuit to hold the buzz source frequency at its latest value throughout each ensuing unvoiced interval. Similarly and for similar reasons, it provides for holding the adjustments of the cutoff frequencies of the several analyzing filters, and the pitch control current deriving apparatus too, at their latest voiced sound values throughout each ensuing unvoiced sound interval.

The invention will be fully apprehended from the following detailed description of a preferred illustrative embodiment thereof taken in connection with the appended drawings in which.

Figure 1:
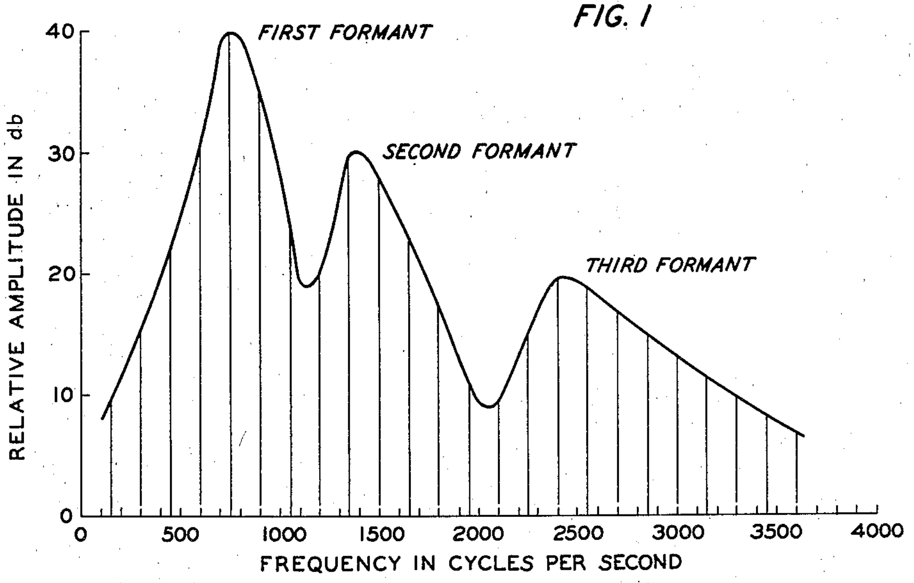
Fig. 1 illustrates the amplitude-frequency relations which hold among the formants of human speech.

Referring now to the drawings, Fig. 1 shows the spectrum of a typical voiced sound of human speech. The various harmonic components of which it is composed fall into three groups of relatively large amplitude, termed formants, with components of lower amplitude between. It will be observed that the amplitudes of the several formant peaks are inversely related to their frequencies. It is a fact that this inverse relation holds for nearly all voiced speech sounds, even though the distribution of their formants on the frequency scale differs markedly from that illustrated in Fig. 1.

Figure 2:
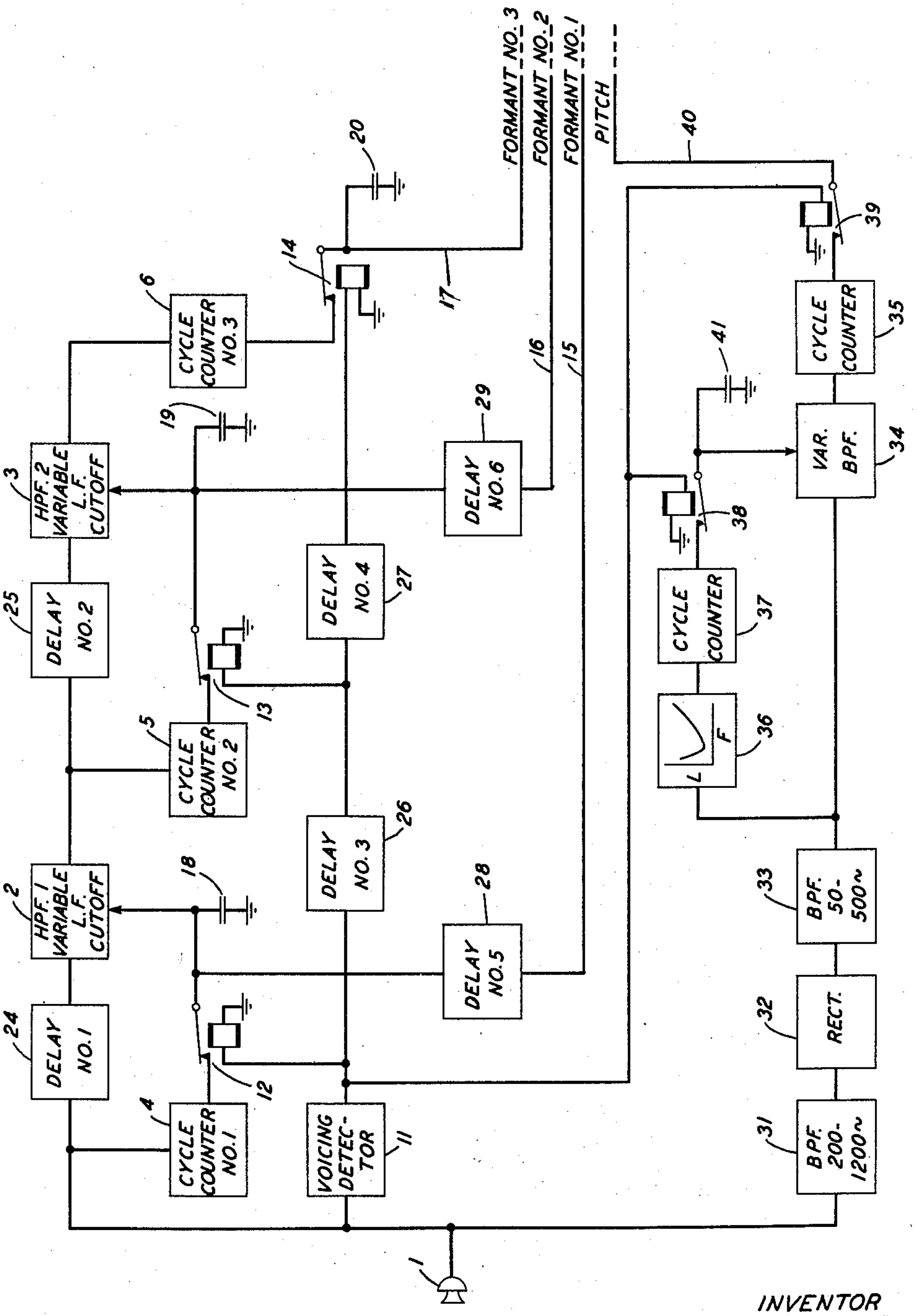
Fig. 2 is a block schematic diagram of a vocoder analyzer in accordance with the invention.

Fig. 2 shows voice analyzer apparatus with which the invention may be practiced. In this figure paths for the flow of currents, energy and information are indicated by single lines in the interest of simplicity. In the implementation of the invention it will in many cases be desirable to employ wire pairs or other complete electrical conduction paths in well known fashion.

In Fig. 2 speech currents originating at a microphone 1 are applied to a spectrum analyzer shown in the upper portion of the figure and to pitch determining apparatus shown in the lower portion. The major components of the spectrum analyzer are a first high-pass filter 2 and a second high-pass filter 3 connected together in tandem, a first cycle counter 4 connected to the input point of the first high-pass filter 2, a second cycle counter 5 connected to the input point of the second high-pass filter 3 and a third cycle counter 6 connected to the output point of the second high-pass filter 3.

Figure 3:
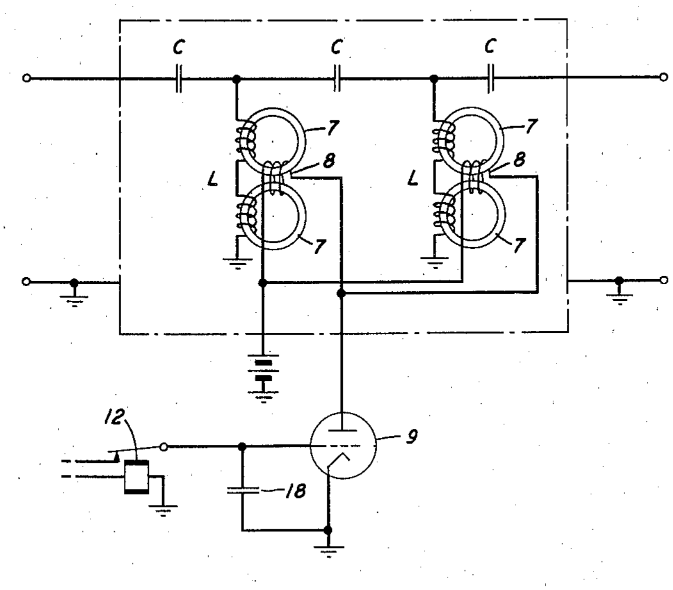
Fig. 3 is a schematic circuit diagram showing the structural details of one of the components of Fig. 1.

Each of the cycle counters 4, 5, 6 may be of well known construction as shown for example in Riesz Patent 2,522,539. Each of the high-pass filters 2, 3 is characterized by a transmission cutoff which bounds its transmission band on the low-frequency side and which is adjustable by a control signal. As illustrated in Fig. 3, it may comprise a number of series condensers C which are fixed and a number of shunt inductors L which are variable, each connected to a point which is common to two adjacent condensers. Each variable inductor may comprise a coil wound on a saturable ferromagnetic core 7 on which is also wound a control winding 8 which may be supplied with current from a controlling source. This current may conveniently be the anode current of a vacuum tube 9 which flows through the control winding 8 from a battery in proportion to the control voltage applied to the grid of the vacuum tube. A preferred variable inductance comprises two such cores 7 with individual inductance windings and a common control winding. The several variable inductances may be controlled together from the same vacuum tube 9.

The speech currents are also applied to a voicing detector 11 which distinguishes between voiced sounds and unvoiced sounds. It may comprise a filter having a pass band which extends from about 100 C. P. S. to about 1,000 C. P. S., followed by a rectifier. Such a voicing detector is more fully described in R. L. Miller Patent 2,627,541. A more refined voicing detector, which is equally suitable for the present system, is described in Dudley Patent 2,243,527. The output of this voicing detector 11 is applied to the windings of three relays 12, 13, 14 whose contacts are connected in series between the outputs of the several cycle counters 4, 5, 6 and the control terminals of the high-pass filters 2, 3, e. g., to the control grids of the buffer amplifier tubes 9 of Fig. 3.

When a voiced sound is being enunciated its spectrum, as illustrated in Fig. 1, is characterized by three principal formants of which the first is of substantially greater amplitude than the second and the third. Consequently, the contacts of the relay 12 being closed by the output of the voicing detector 11, the cycle counter 4 delivers a voltage which is very closely proportional to the frequency of the first formant. This control voltage is applied to the control terminal of the first high-pass filter 2 and operates to cause a current to flow in the saturating windings 8 of the cores such as to produce a magnitude for the inductances L which, in cooperation with the capacitances C of the condensers, establishes the low-frequency cutoff of the high-pass filter 2 at a frequency lying between the frequency of the first voice formant and the frequency of the second voice formant, and preferably just above that of the first voice formant. Thus the current passing through the first high-pass filter 2 contains second formant energy and third formant energy but no substantial amount of first formant energy, the latter having been removed by the foregoing adjustment of the low-frequency cutoff of the first high-pass filter 2.

The output of the first high-pass filter 2 is applied to the second cycle counter 5 and to the second high-pass filter 3. The cycle counter 5 delivers a control voltage which is proportional to the frequency of the predominating component of the energy which it receives. As illustrated in Fig. 1, the second formant of ordinary speech substantially exceeds the third formant in magnitude. This control voltage is thus proportional to the frequency of the second formant. The contacts of the relay 13 being closed by the output of the voicing detector 11, this control voltage is applied to the control terminal of the second high-pass filter 3 and operates, as in the case of the first high-pass filter 2, to adjust its low-frequency cutoff to a frequency lying between that of the second formant and that of the third formant. Hence, the second high-pass filter 3 blocks passage of second formant energy and passes only the energy of the third and higher formants. This is applied to the third cycle counter 6 which determines the frequency of its predominating component; i. e., that of the third formant of the speech, and delivers a corresponding control voltage by way of the contacts of the relay 14 when they are closed by the output of the voicing detector 11.

The outputs of the several cycle counters 4, 5, 6 thus constitute a first formant control voltage, a second formant control voltage and a third formant control voltage, which appear on the outgoing conductors 15, 16, 17, respectively. These control voltages undergo variations as the voiced sound being analyzed changes its character. When the voiced sound gives way to an unvoiced sound, the output of the voicing detector 11 falls below the level which energizes the windings of the relays 12, 13, 14, and the relay contacts open. In accordance with the invention the three formant control voltages do not now fall to zero but remain fixed at their latest values. This fixation or holding of the formant control voltages is secured by connection of a large capacity storage condenser 18, 19, 20 to the moving contact of each of the relays 12, 13, 14. When next the speech sound is voiced, the relay contacts are again closed, the formant control voltages adopt new values and shift, as before, as the character of the voiced sound changes.

The foregoing operations require time for their completion. Because of their sequential character, delays are thus unavoidably introduced. These delays may be compensated by the introduction of delay equalizers 24—29 at appropriate points of the apparatus.

The speech current is also applied to the pitch detecting apparatus as shown in the lower part of the figure. This may comprise a band-pass filter 31 whose pass band extends approximately from 200 C. P. S. to 1,200 C. P. S., followed in tandem by a rectifier 32 and a second band-pass filter 33 having a pass band extending from approximately 50 C. P. S. to 500 C. P. S. The output of this filter 33 is applied to a filter 34 whose pass band is variable as to its location on the frequency scale, connected in a tandem with a first frequency meter, e. g. a cycle counter 35. Provided the pass band of the variable filter 34 is properly located to include the fundamental frequency component of the voiced sound and no substantial energy at any other frequency, its output consists of a comparatively pure wave having the fundamental voice frequency. This is applied to the frequency meter 35 which delivers a voltage proportional to the fundamental frequency. This voltage constitutes a pitch control signal.

The adjustment of the pass band of the variable filter 34 to the proper region on the frequency scale may be accomplished by a branch path comprising a network 36 having a low-frequency characteristic such as to attenuate frequencies higher than the expected fundamental in proportion to their frequencies, and also low-frequency noise. It is followed in tandem by a second frequency meter or cycle counter 37 whose output voltage is thus an approximate measure of the voice frequency. This is applied by way of the contacts of a relay 38 to the control terminal of the variable filter 34, thus to adjust its pass band in the fashion described above. As a consequence of these connections the output of the first frequency meter 35 is a more refined indication of the pitch of the voice than is that of the second frequency meter 37. Closure of the contacts of a relay 39 by the voicing detector 11 permits the output of the counter 35 to appear as a pitch control signal on a conductor 40.

The variable band-pass filter 34 itself may be of any desired variety. For example it may comprise a fixed condenser connected in parallel with a current-controlled inductor of the type shown in Fig. 3, this parallel combination being connected with respect to one or more series resistors in the fashion well known for band pass filters and as shown for example in Peterson Patent 2,593,695.

The relay contacts connected in series with the output terminals of the two frequency meters are held closed by the windings of relays 38, 39 that are energized by the output of the voicing detector 11. Thus when a voiced sound gives place to an unvoiced sound these relays are released and their contacts are opened.

In accordance with the invention the movable contact of the relay 38 is connected to a storage condenser 41 of substantial capacitance. This acts to hold the control voltage applied to the control terminal of the variable band-pass filter 34 at its latest value, thus to place it in readiness for the next voiced sound to arrive.

Refinements of the variable band-pass filter 34 may be employed as desired. Among such refinements are those shown in Mathes Patent 2,562,109 and in Miller Patent 2,627,541, which employ frequency modulation techniques. In this event, a storage condenser may be employed to hold the latest frequency of the frequency-modulated oscillator of these patents throughout each unvoiced sound and until the return of voicing.

Figure 4:
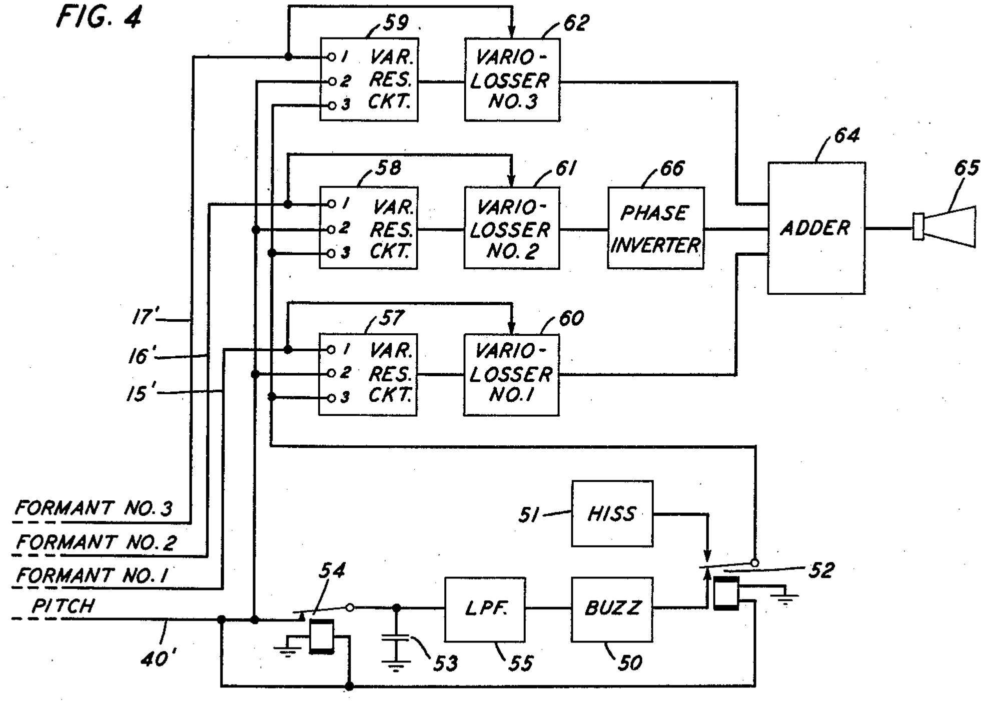
Fig. 4 is a block schematic diagram of a vocoder synthesizer in accordance with the invention.

The pitch control signal and the three formant frequency control signals are transmitted in any desired fashion over an intervening medium, indicated on the drawing by broken lines, to a receiver or synthesizer station. This apparatus, shown in block diagram form in Fig. 4, may be a modification of a synthesizer shown and described in an application of E. S. Weibel, Serial No. 428,167, filed May 7, 1954. Here the pitch control signal on a conductor 40′ operates and controls the frequency of a buzz source 50 and, when it falls below a pre-assigned low amplitude threshold, indicating the absence of a voiced sound at the transmitter, turns off the buzz source 50 and permits a hiss source 51 to be turned on in its stead. The buzz source 50 and its controlled tuning, the hiss source 51, the pitch-signal-operated relay 52 which selects between them, and a low pass filter 55 may be as shown in Riesz Patent 2,522,539, Fig. 3. In addition to these conventional elements, a storage condenser 53 is connected between the tuning input point of the buzz source 50 and ground. It acts to hold the latest value of the buzz source frequency throughout each unvoiced sound, when failure of the pitch signal, by releasing the winding of a relay 54, allows its contacts to open. Thus when next the pitch signal returns with the return of voicing, the frequency of the buzz source 50 will already have been adjusted to its most probable next value.

Three variable resonant circuits 57, 58, 59 are provided, one of which corresponds to the first voice formant, one to the second and one to the third. Each of them is provided with three input points labeled 1, 2 and 3, respectively, on the drawing. The first formant frequency control signal, from the counter 4, is applied to the first input point of the first variable resonant circuit 57. The second formant frequency control signal, from the counter 5, is applied to the first input point of the second variable resonant circuit 58, and the third formant frequency control signal, from the counter 6, is applied to the first input point of the third variable resonant circuit 59. The pitch control signal, from the counter 35, is applied in parallel to the No. 2 input points of all three of the variable resonant circuits 57, 58, 59 while the output of the buzz source 50 or the hiss source 51, as the case may be, is applied in parallel to the No. 3 input points of all three of the variable resonant circuits.

In tandem with the output terminals of the several variable resonant circuits 57, 58, 59 there are connected elements 60, 61, 62 which introduce controllable amounts of gain or attenuation. These may be simple variable gain amplifiers or variolossers as preferred. In prior art apparatus of the same general character, these elements are individually operated and controlled by formant amplitude control currents derived at the analyzer station and transmitted over the intervening medium. In accordance with the present invention, the inverse relation of Fig. 1, which holds between formant frequency and formant amplitude, is turned to account by the application of the formant frequency control currents as they appear on the conductors 15', 16', 17', to control these elements. If variolossers are employed, the application may be direct, and introduces a loss which increases with frequency, as required by Fig. 1. If variable gain amplifiers are employed the control signal should be inverted before application to the amplifier gain control terminals.

The outputs of the several variable loss elements 60, 62, 62 are additively combined as by application to an adder 64 whose output in turn feeds a sound reproducer 65. For the reasons stated in the aforementioned Weibel application, a phase inversion is introduced in series between the buzz or hiss source 50 or 51 and the adder 64 in the case of alternate ones of the group of variable resonant circuits. Inasmuch as for voice reproduction purposes, three such variable resonant circuits normally suffice, the most economical fashion in which such alternate phase inversions may be introduced is to provide a phase inverter 66 in the second path only. It is shown as following the variable loss element 61, although obviously it could equally well be inserted ahead of the variable loss element 61 or ahead of the variable resonant circuit 58 in series with its No. 3 input point.

Figure 5:
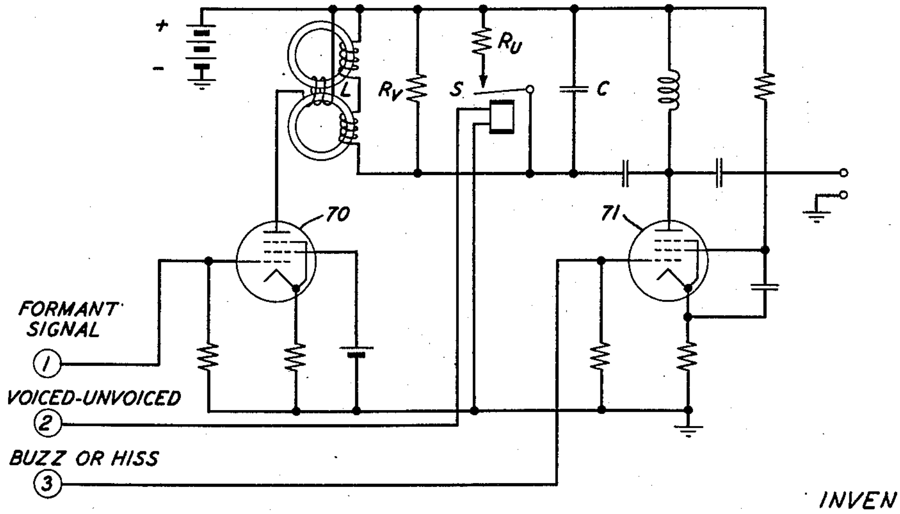
Fig. 5 is a schematic circuit diagram showing the structural details of one of the components of Fig. 4.

The details of a circuit suitable for any one of the variable resonant circuits 57, 58, 59 are illustrated in Fig. 5. The heart of this figure comprises a parallel arrangement of a fixed condenser C, a current-controlled variable inductance element L and a fixed damping resistor $R_v$ (voiced), and provision for supplying these elements with energy from a current source. As suggested in the aforementioned Weibel application, a second fixed resistor $R_u$ (unvoiced) in series with relay contacts S is shunted across the first resistor $R_v$ to increase the damping of the resonant circuit for the artificial reproduction of unvoiced sounds. The contacts S are held open, thus excluding the resistor $R_u$ from the circuit, when the relay winding is energized by the application of a voiced sound signal to the No. 2 input point.

The variable inductance L may comprise a winding or windings on a ferromagnetic core or cores, and a control current winding. The latter may be supplied from a pentode 70 to whose control grid the frequency control voltage is applied. Similarly, a pentode 71 may be interposed between each of the RLC combinations and the buzz or hiss source which supplies it through its No. 3 input point.

What is claimed is:

1. Apparatus for determining at least two formant frequencies of a speech sound which comprises a high-pass filter having input terminals, output terminals and a transmission characteristic which includes an adjustable low-frequency cutoff, means for applying speech currents to said input terminals, means for withdrawing from said output terminals speech currents that are modified by the transmission characteristic of said filter, means coupled to the input terminals of said filter and responsive to the frequency of a predominant component of said applied speech currents for generating a control signal indicative of said frequency, means under control of said control signal for adjusting the low-frequency cutoff of said filter to block transmission of said predominant component through said filter, and means for determining the frequency of a predominant component of said filter-modified output currents.

2. Apparatus for determining the formant frequencies of a speech sound which comprises a plurality of high-pass filters connected together in tandem, each of said filters having input terminals, output terminals and a transmission characteristic including a low-frequency cutoff which is adjustable under the influence of a control signal, means for applying speech currents to the input terminals of the first of said filters, thereby to transfer to each of the successive filters currents as modified by prior ones of said filters, means coupled to the input terminals of each of said filters and responsive to the frequency of the predominant component of currents applied to that filter for generating a control signal indicative of the frequency of said last-named predominant component, and means under control of said several control signals for adjusting the low-frequency cutoffs of said several filters to block transmission through each of said filters of the predominant component of the energy applied thereto.

3. In apparatus for analyzing speech sounds, means to derive varying control signals which are continuously representative of changing characteristics of such sounds, at least one of such characteristics vanishing in the case of unvoiced sounds, and means controlled by said last-named characteristic for holding each of said control signals throughout the duration of each unvoiced sound at its latest voiced sound value.

4. In apparatus for analyzing speech sounds to derive varying control signals which are continuously representative of the formant frequencies and the pitch of such sounds, said pitch control signal vanishing in the case of unvoiced sounds, means for generating an auxiliary signal of a first kind for voiced sounds and of a second kind for unvoiced sounds, and means controlled by said last named means for holding each of said formant frequency control signals, throughout the duration of each unvoiced sound, at its latest voiced sound value.

5. In apparatus for analyzing speech sounds to derive varying control signals which are continuously representative of the formant frequencies of those of said sounds that are voiced, means for generating an auxiliary signal of a first kind for voiced sounds and of a second kind for unvoiced sounds, and means, controlled by said last-named means and operative during each unvoiced sound, for holding said formant frequency control signals, throughout each such unvoiced sound, at its most recent voiced sound value.

6. In apparatus for analyzing speech sounds, a tunable band-pass filter, means for applying speech sound currents to said filter, means for deriving a first control signal which is approximately representative of the pitch frequency of such of said sounds as are voiced, means responsive to said approximate signal for tuning said filter to pass speech sound components of said pitch frequency, means for determining the frequency of currents transmitted through said filter, said determined frequency being thus a more refined measure of the pitch of said sounds, and means, operative on the occurrence of each unvoiced sound, for holding the tuned condition of said filter at its most recent voiced-sound value.

7. Apparatus for the artificial synthesis of a speech sound from incoming control signals, which are representative, respectively, of the frequencies of the several formants of said speech sound and of its pitch, which comprises a plurality of tunable resonant circuits, means, for each of said speech sound formants, for tuning one of said resonant circuits under control of a corresponding one of said control signals, to the corresponding one of said formant frequencies, a source of harmonic energy, means controlled by said pitch control signal for controlling the frequency of said source to correspond with the pitch of said speech sound, means for applying the energy of said source to all of said resonant circuits, means associated with each of said resonant circuits for varying the level of its output currents substantially in inverse relation to its resonant frequency, means for combining said level-adjusted output currents, and means for converting said combined currents into sound waves.

8. In apparatus for synthesizing artificial speech sounds from incoming control signals, one of which, representative of the speech sound pitch, ceases throughout each unvoiced sound, a plurality of filters, a buzz source, a hiss source, means controlled by said pitch signal, when present, for applying energy of said buzz source to said filters, means controlled by said pitch signal, when absent, for applying energy of said hiss source to said filters, means controlled by said pitch signal, when present, for tuning said buzz source to the pitch of said speech sound, means controlled by said pitch signal, when absent, for holding the tuned condition of said buzz source, throughout the duration of each unvoiced sound, at its most recent voiced-sound value, means for combining the outputs of said filters, and means for reproducing said combined filter outputs as an audible sound.

9. Apparatus as defined in claim 4 wherein said holding means comprises, for each of said control signals, a switch having an input conduction terminal and an output conduction terminal connected in series in the path of said control signal, and a control terminal, a holding condenser connected in shunt with said output conduction terminal, and connections for applying said auxiliary signal to said control terminal to open said switch throughout each unvoiced sound.

10. Apparatus as defined in claim 8 wherein said holding means comprises a switch having an input conduction terminal and an output conduction terminal, connected in series in the path of said pitch signal, and a control terminal, a holding condenser connected in shunt with said output conduction terminal, and connections for applying said pitch signal to said control terminal to open said switch throughout each unvoiced sound.

11. Apparatus for analyzing a speech current to derive a plurality of control signals each of which is indicative of one of a plurality of speech formant frequencies, which comprises means responsive to the frequency of the predominant component of said speech current for deriving a first control signal representative of said frequency, means responsive to said first control signal for removing said component from said speech current, means responsive to the frequency of the predominant component remaining in said speech current after said removal for deriving a second control signal representative of said last-named frequency, and means for transmitting said first and second control signals.

12. Apparatus for analyzing a speech current to derive a plurality of control signals each of which is indicative of one of a plurality of speech formant frequencies, which comprises means responsive to the frequency of the predominant component of said speech current for deriving a first control signal, means responsive to said first control signal for removing said component from said speech current, means responsive to the frequency of the predominant component remaining in said speech current after said removal for deriving a second control signal, means responsive to said second control signal for removing said last-named predominant component from said speech current, means responsive to the frequency of the predominant component remaining in said speech current after said first and second removals for deriving a third control signal, and means for transmitting said first, second and third control signals.

13. Apparatus for deriving control currents representative of at least two formant frequencies of a speech sound which comprises a filter having an input terminal, an output terminal, and a control terminal, said filter being constructed to pass, without substantial attenuation, all frequency components of said speech sound that are higher than an adjustable cutoff frequency and to block all frequency components of said speech sound that are lower than said adjustable cutoff frequency, means for applying speech currents to said input terminal, means for withdrawing from said output terminal speech currents that are modified by the transmission characteristic of said filter, a first frequency discriminator coupled to said input terminal and responsive to a predominant component of said applied speech currents for delivering a signal representative of the frequency of said predominant component, connections for applying said signal to the control terminal of said filter, thereby to adjust the cutoff frequency of said filter to a point of the frequency scale that lies higher than the frequency of said predominant component, a second frequency discriminator coupled to said output terminal and responsive to a predominant component of current passed by said filter for delivering a signal representative of the frequency of said last-named predominant component, and means for transmitting each of said frequency-representative signals.

References Cited in the file of this patent

UNITED STATES PATENTS

| | | |
|---|---|---|
| 2,640,880 | Aigram et al. | June 2, 1953 |
| 2,705,742 | Miller | Apr. 5, 1955 |